(12) United States Patent
Carrender

(10) Patent No.: US 6,970,089 B2
(45) Date of Patent: Nov. 29, 2005

(54) FULL-SPECTRUM PASSIVE COMMUNICATION SYSTEM AND METHOD

(75) Inventor: Curt Carrender, Morgan Hill, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 441 days.

(21) Appl. No.: 10/189,113

(22) Filed: Jul. 3, 2002

(65) Prior Publication Data

US 2004/0005863 A1    Jan. 8, 2004

(51) Int. Cl.⁷ .............................................. G08B 13/14
(52) U.S. Cl. ............................. 340/572.4; 340/572.7; 340/10.1
(58) Field of Search .................... 340/572.4, 572.7, 340/572.1, 10.1, 10.4

(56) References Cited

U.S. PATENT DOCUMENTS

| | | | |
|---|---|---|---|
| 4,075,632 A | 2/1978 | Baldwin et al. | 343/6.8 R |
| 4,360,810 A | 11/1982 | Landt et al. | 343/6.5 R |
| 4,656,463 A | 4/1987 | Anders et al. | 340/572 |
| 4,736,207 A | 4/1988 | Siikarla et al. | 343/895 |
| 4,737,790 A | 4/1988 | Skeie et al. | 342/51 |
| 4,742,573 A | 5/1988 | Popovic | 455/607 |
| 4,791,285 A | 12/1988 | Ohki | 235/449 |
| 4,912,471 A | 3/1990 | Tyburski et al. | 342/42 |
| 5,113,184 A | 5/1992 | Katayama | 340/825.54 |
| 5,153,583 A | 10/1992 | Murdoch | 340/825.54 |
| 5,300,875 A | 4/1994 | Tuttle | 320/20 |
| 5,305,008 A | 4/1994 | Turner et al. | 342/44 |
| 5,420,579 A | 5/1995 | Urbas et al. | 340/870.31 |
| 5,457,447 A | 10/1995 | Ghaem et al. | 340/825.54 |
| 5,517,195 A | 5/1996 | Narlow et al. | 342/51 |
| 5,850,181 A | 12/1998 | Heinrich et al. | 340/572 |
| 6,056,199 A | 5/2000 | Wiklof et al. | 235/462.45 |
| 6,058,497 A | 5/2000 | Tuttle | 714/733 |
| 6,060,815 A | 5/2000 | Nysen | 310/318 |
| 6,243,012 B1 | 6/2001 | Shober et al. | 340/572.7 |
| 6,356,230 B1 * | 3/2002 | Greef et al. | 342/127 |
| 6,411,212 B1 | 6/2002 | Hecht et al. | 340/572.1 |
| 6,727,803 B2 * | 4/2004 | Hulvey | 340/10.31 |
| 6,745,008 B1 * | 6/2004 | Carrender et al. | 455/41.1 |
| 6,775,323 B1 * | 8/2004 | Pillai et al. | 375/238 |
| 6,781,508 B2 * | 8/2004 | Tuttle et al. | 340/10.1 |

FOREIGN PATENT DOCUMENTS

| | | |
|---|---|---|
| DE | 198 32 628 A1 | 2/2000 |
| EP | 0 309 201 B1 | 5/1993 |
| EP | 1 168 237 A2 | 1/2002 |
| FR | 2 701 614 A1 | 8/1994 |
| WO | WO 94/14143 | 6/1994 |
| WO | WO 01/84181 A2 | 11/2001 |

* cited by examiner

*Primary Examiner*—Toan N. Pham
(74) *Attorney, Agent, or Firm*—Seed IP Law Group PLLC

(57) ABSTRACT

A passive communication system having devices with wide-band antenna circuits configured to receive ambient radiation and to use the energy therefrom to reflect a modulated signal, preferably using backscatter techniques, for writing and reading data to and from the devices in the system.

19 Claims, 1 Drawing Sheet

FULL-SPECTRUM PASSIVE COMMUNICATION SYSTEM AND METHOD

BACKGROUND OF THE INVENTION

1. Field of the Invention

The present invention pertains to communication based on backscatter techniques, and more particularly to a wideband, fully passive communication system and method that uses reception and modulation of ambient environmental energy.

2. Description of the Related Art

Communication using a passive (non-powered) device where an interrogation signal is modulated and reflected by the passive device is known. One example of this form of communication is in the radio-frequency identification (RFID) and auto identification technologies, which use backscatter communication.

Backscatter communications involves selectively changing and reflecting a received signal. For example, modulating the radar cross-section of a target causes energy reflected off the target to contain the information in its phase or amplitude modulation. A unit receiving the reflected energy, typically called a "reader," which usually has supplied the original energy required for this communication, is configured to extract the data in the signal by comparing the received reflected signal to the original interrogation signal.

By way of analogy, a reader in the form of a flashlight has its beam of light aimed at a person with a mirror. The individual with the mirror begins selectively reflecting the flashlight's beam back to the flashlight. The selective reflection can be done in a digital fashion, i.e., off and on. This allows the person holding the mirror to communicate without the necessity of generating additional energy.

In RFID technology, commercial backscatter communications systems utilize microwave frequencies. This technology, which has been available for several decades, uses a target, called a "tag," to respond to an interrogation signal for identification purposes.

More particularly, and by way of example, referring to FIG. 1, shown therein is a basic RFID system 10 that includes three components, an antenna 12, a transceiver with decoder 14, and a transponder or tag 16 having its own antenna 18. In operation, the transceiver 14 generates electromagnetic radio signals 22 that are emitted by the antenna 12 and are received by the tag 16. When the tag 16 is activated by the signal, data can be read from or written to the tag 16.

In certain applications, the transceiver antenna 12 is a component of the transceiver and decoder 14, which makes it an interrogator 20 (or reader), and which can be configured either as a hand-held or fixed-mount device. The interrogator 20 emits the radio signals 22 in a range from one inch to 100 feet or more, depending upon its power input and the radio frequency used. When the RF tag 16 passes through the radio signals 22, the tag 16 detects the signal 22 and is activated. Data encoded in the tag 16 is then transmitted through reflection by a modulated data signal 24 through the antenna 18 in the tag 16 and to the interrogator 20 for subsequent processing.

RFID tags that are powered by the interrogation signal are often referred to as a passive device because they derive the energy needed for operation from the radio frequency energy beamed at it. The tag rectifies the field and dynamically changes the reflective characteristics of the tag antenna, creating a change in reflectivity that is seen at the interrogator. In contrast, a battery-powered semi-passive RFID tag operates in a like fashion, modulating its RF cross-section in order to reflect a delta to the interrogator to develop a communication link. Here, the battery is the source of the tag's operational power. In an active RFID tag, a transmitter is used to create its own radio frequency energy powered by the battery.

Conventional continuous wave backscatter RF tag systems that utilize passive (no battery) RF tags require adequate power from the signal 22 to power the tag's internal circuitry used to modulate the signal back to the interrogator 20. Efficient collection of this energy from the signal 22 is necessary to maximize system performance. Impedance matching of antenna circuit components at the desired frequency is one method to optimize efficiency. However, size and performance constraints of RFID tag systems render existing impedance matching designs infeasible. Another disadvantage is the restrictions imposed on signal power and data flow in the RF signals by government regulation.

BRIEF SUMMARY OF THE INVENTION

The disclosed embodiments of the invention are directed to passive communication that derives its communication energy from ambient radiation. This device may be beam, battery, or externally powered. In one embodiment, a passive communication device is provided having an antenna that is configured to receive ambient radiation, such as electromagnetic energy or radio-frequency energy, to selectively absorb or phase modify this energy, preferably in a digital fashion, and to form a modulated signal that is reflected via the antenna in the form of backscatter transmission.

In accordance with another embodiment of the invention, a second communication device is provided having an antenna circuit that is configured to receive the ambient radiation and to receive the backscatter transmission from the first device and to detect the modulated signal. In accordance with one aspect of this embodiment of the invention, the detection is accomplished by delaying the signal received on the second antenna and comparing the delayed signal to the first signal to extract or filter out the modulated signal. In accordance with another aspect of this embodiment of the invention, directional or polarization selectivity of the second antenna can be used to facilitate detection of the modulated signal.

In accordance with a further aspect of the foregoing embodiment, reading of the backscattered transmission is accomplished using wide-band illumination as opposed to ambient illumination.

In accordance with still yet another aspect of this embodiment of the invention, Code Division Multiple Access (CDMA) techniques are used to simultaneously decode multiple modulated signals received from multiple communication devices, ideally all of the communication devices powered by the ambient illumination.

In accordance with a method of the present invention, a communication technique is provided that includes receiving ambient radiation at a first passive device having a wide-band antenna circuit configured to selectively absorb or phase modify the ambient radiation and to reflect a modulated signal via backscatter transmission; and receiving the ambient radiation at a second device that detects and decodes the modulated signal utilizing the ambient radiation for power, including power for comparison of the modulated signal to the ambient radiation.

BRIEF DESCRIPTION OF THE SEVERAL VIEWS OF THE DRAWING(S)

The foregoing and other features and advantages of the present invention will be more readily appreciated as the same become better understood from the following detailed description when taken in conjunction with the accompanying drawings, wherein.

DETAILED DESCRIPTION OF THE INVENTION

Figure 1:
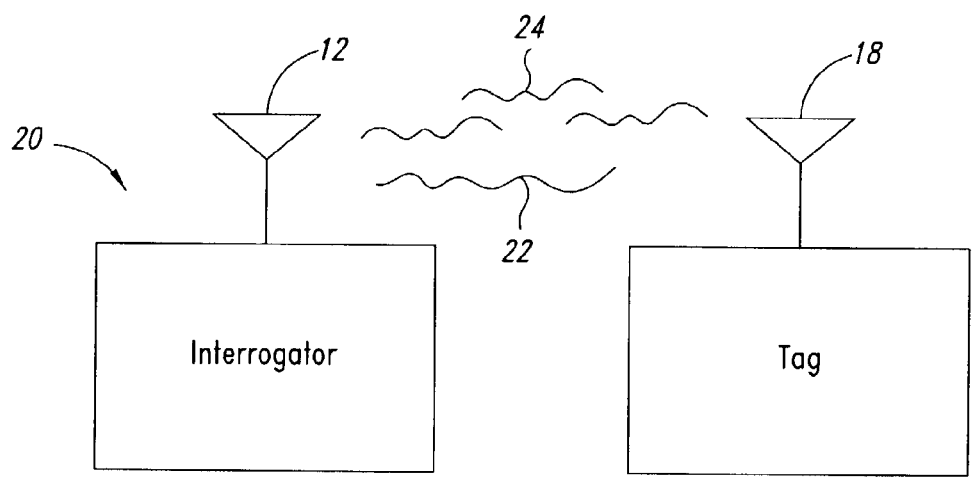
FIG. 1 is a diagram illustrating a basic RFID system.
Figure 2:
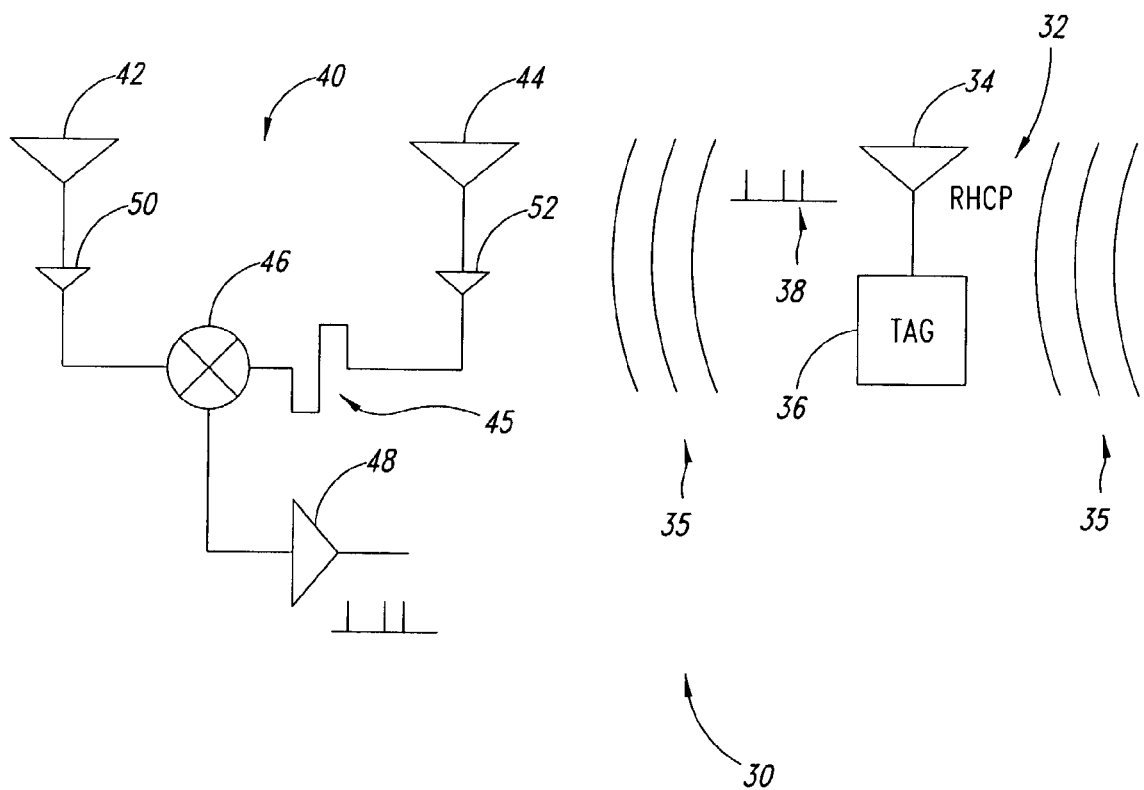
FIG. 2 is a diagram illustrating a full-spectrum, passive communication system formed in accordance with one embodiment of the present invention.

Referring next to FIG. 2, shown therein is a full-spectrum, passive communication system 30 configured in accordance with the inverse modulation techniques that are unique to the present invention.

Inverse modulation utilizes the technology of backscatter communication, as explained above. In traditional backscatter communications, one end of the communications link consists of a "tag" that develops its link back to a reader based on controlled changes in its reflective characteristics. Using the traditional approach, the reader beams energy at the tag to be available for this purpose. Comparatively, in the inverse modulation technique, the "tag" is configured to now reflect modulated ambient energy to another communication device. The ambient energy that is modulated may be common radio or TV station signals, cell phone signals, or any RF energy incident to the tag.

The second communication device is configured to sense the modulation in the ambient radiation and to extract the information therefrom. The tag may also be configured to communicate in the same manner back to the first communication device or tag. In this sense, there is no actual tag and reader but merely two links in a communication system. The fundamental feature of this unique communication system is that no new RF or microwave energy is required, or from a battery or other power source, or even from a generated interrogation signal, to establish the communication link.

Referring to FIG. 2, a representative embodiment of the system 30 is shown to include a first communication device 32 having an antenna 34 coupled to a modulation circuit 36. Ideally, the antenna 34 is a wide-band antenna configured to receive ambient radiation 35 from radio or TV stations, cell phone signals, or any radio frequency energy incident to the first device 32. Modulation of this received ambient energy 35 is accomplished by selective absorption or phase change, in a digital fashion, of the ambient energy. This creates a modulated signal 38 in digital form. This modulated signal 38 is then transmitted via the antenna 34 using backscatter transmission.

A second communication device 40 is also provided that includes a first antenna 42 and a second antenna 44 coupled to a mixer 46 having an output that is coupled to an output amplifier 48. In one embodiment, an amplifier 50 couples the first antenna 42 to the mixer 46 and a second amplifier 52 couples the second antenna 44 to the mixer 46. Both antennas in this embodiment are configured to receive ambient radiation, with the signal received on the second antenna 44 delayed by a delay circuit 45 through the mixer 46. The delay provides a window for a comparison between the signals received on the first and second antennas 42, 44 and extraction of the modulated signal 38, which is then output through the output amplifier 48. The ambient energy is constantly changing, and thus the period of the delay must present a small enough window to allow a comparison of the ambient energy. The modulation must also be short to fit within the delay window. However, large data transmission rates can be achieved.

FIG. 2 also shows the first antenna 42 configured to be left hand circularly polarized and the second antenna 44 being right hand circularly polarized. In addition, the first communication device 32 has its antenna 34 right hand circularly polarized. Using the principle that ambient noise is consistent during a short-enough time period, and using the principle that this noise is randomly polarized in a circular sense, broadband antennas are used to mix a reference signal with a similar source more responsive to a particular tag's backscatter transmission. Hence, the second antenna 44 is polarized to match the polarization of the antenna 34 on the first device 32. Although the polarization aids in discriminating the modulated signal from the ambient energy, the delay may be used to further enhance extraction of the signal, although the delay may not be used depending on the needs of the particular application. In another embodiment, directional or polarization selectivity of the second antenna alone may be used in order to detect the modulated signal.

In another embodiment, a circulator circuit replaces the second antenna. The circulator circuit is structured to have an output that feeds a path mimicking the input to the mixer 46 from the second antenna.

As mentioned above, the most efficient method of communication using the inverse modulation technique is with very narrow pulses containing the information to be transmitted. The spacing and timing of these pulses constitutes the information or data to be sent. As the local equivalent of a reference "low" for direct down conversion is actual ambient spectra, and because this is a very dynamic reference, the requirement of a narrow pulse width for modulation allows for correlation between data edges above the actual noise floor. In other words, the inverse modulation technique requires very narrow pulses, but it will deliver very high data rates.

As described above, the receiving communication device utilizes the technique of receiving these narrow pulse data bits using very small time delays. The ambient environmental spectra is compared to itself using this small delay. In the example described in connection with FIG. 2, one input of the mixer 46 is fed with the wide-band ambient environmental spectra and the other input of the mixer 46 is fed with the same spectra that is delayed in time a small amount related to the edge and pulse speed of the transmitted data.

Ideally, the use of a fractal antenna can provide the advantage of very wide bandwidth, which allows for the maximum availability of energy for the communication link to be established.

While representative embodiments of the invention have been illustrated and described, it is to be understood that various changes may be made therein without departing from the spirit and scope of the invention. For example, multiple tags may be used to simultaneously transmit modulated signals to a single receiving device. In this embodiment, CDMA may be used to simultaneously decode multiple signals received at the second device 40 from the multiple communication devices. Hence, the invention is to be limited only by the scope of the claims that follow and the equivalents thereof.

The communication system components may be manufactured in accordance with known techniques, including the fluidic self-assembly process disclosed in U.S. Pat. Nos. 6,291,896; 6,281,038; and 6,274,508, all of which are incorporated by reference herein in their entirety.

From the foregoing it will be appreciated that, although specific embodiments of the invention have been described herein for purposes of illustration, various modifications may be made without deviating from the scope of the invention. Accordingly, the invention is not to be limited except as by the appended claims and the equivalents thereof.

What is claimed is:

1. A communication device, comprising:
a passive receiver coupled to first and second antennae to receive and reflect wide-band ambient radiation, the receiver configured to modulate the received ambient radiation to form a modulated signal and to transmit the modulated signal via backscatter transmission, the device further comprising a mixer to receive signals from the antennae and extract a modulated signal therefrom using energy from the ambient radiation.

2. A communication device, comprising:
a passive receiver having a first wide-band antenna configured to receive ambient radiation, a second antenna configured to receive ambient radiation, a mixer having first and second inputs fed with respective outputs from the first and second antennas, the output from the second antenna delayed at the mixer with respect to the output from the first antenna for comparison and extraction of a modulated signal.

3. The device of claim 2 wherein the first antenna has a first polarization and the second antenna has a second polarization.

4. The device of claim 2 wherein the first and second antennas are identical and are pointed in the same direction.

5. The device of claim 2 wherein the second antenna is configured to have directional selectivity to enhance detection of a modulated signal in the ambient radiation.

6. A communication device, comprising:
a passive receiver having a wide-band antenna configured to receive ambient radiation and a circulator circuit configured to mimic input from a second antenna and a mixer configured to receive outputs from a second antenna and a mixer configured to receive outputs from the antenna and the circulator and to extract a modulated signal therefrom.

7. A communication system, comprising:
a first passive receiver having an antenna and configured to receive ambient energy, to modulate the received ambient energy to form a modulated signal, and to transmit the modulated signal via backscatter transmission through the antenna; and
a second passive receiver having an antenna circuit configured to receive the ambient energy with the modulated signal, and to extract the modulated signal from the ambient energy.

8. The system of claim 7 wherein the antenna circuit of the second passive receiver comprises a first antenna and a second antenna, the second antenna having directional selectivity to enhance reception and detection of the modulated signal.

9. The system of claim 7 wherein the antenna circuit of the second passive receiver comprises a first polarized antenna and a second polarized antenna, the first polarized antenna having a polarization that is opposite to a polarization of the second antenna, and the antenna of the first passive receiver comprises a polarized antenna having the polarization of the second antenna of the second passive receiver.

10. The system of claim 7 wherein the second passive receiver is configured to use CDMA to simultaneously decode multiple modulated signals received at the antenna circuit.

11. A communication system, comprising:
a first passive device having a wide-band antenna circuit and configured to receive wide-band radio frequency radiation and to utilize energy from the received radio frequency radiation to reflect a modulated signal; and
a second passive device configured to receive the wide-band ambient energy and to extract the modulated signal therefrom.

12. The system of claim 11 wherein the second passive device comprises first and second antennas coupled to a mixer, the second antenna coupled to the mixer via a delay circuit, the mixer configured to compare the signals received on the first and second antennas and to extract the modulated signal therefrom.

13. A communication method, comprising:
receiving ambient radiation at a first passive device having a wide-band antenna circuit configured to receive and utilize the energy from the received ambient radiation to reflect a modulated signal via backscatter transmission; and
receiving at a second passive device the ambient radiation from a wide band of radio frequency transmissions; and
using the energy from the received ambient radiation to detect the modulated signal therein.

14. A communication method, comprising:
receiving ambient radiation at a first passive device having a wide-band antenna circuit and utilizing the energy from the received radiation to reflect a modulated signal;
receiving at a second passive device the ambient radiation and the modulated signal and extracting the modulated signal therefrom using the energy from the received ambient radiation; and
using the energy received from the ambient radiation to generate a further modulated signal therefrom for backscatter transmission from the second passive device to the first passive device.

15. A full spectrum passive communication system, comprising:
a first passive communication device comprising a passive modulation circuit coupled to a wide-band antenna and configured to receive ambient radiation and to reflect a modulated signal in response thereto; and
a second passive communication device comprising a detection circuit coupled to a first antenna circuit configured to receive ambient radiation and to a second antenna circuit configured to receive ambient radiation, the detection circuit configured to compare the signals received on the first and second antenna circuits to extract the modulated signal.

16. The system of claim 15 wherein the detection circuit comprises a mixer coupled to the first and second antenna circuits and a delay circuit coupled between the mixer and the second antenna circuit.

17. The system of claim 15 wherein the first and second antenna circuits are polarized to have opposite polarizations.

18. The system of claim 15 wherein the wide-band antenna of the first passive communication device is polarized to match the polarization of one of the first and second antenna circuits of the second passive communication device.

19. The system of claim 15 wherein the first and second antenna circuits are configured to have directional sensitivity.

* * * * *